United States Patent [19]
Yu

[11] Patent Number: 5,482,302
[45] Date of Patent: Jan. 9, 1996

[54] HUMAN POWERED SKIBOB

[76] Inventor: Alfred Yu, 1923 - 73 Street, Edmonton, Alberta, Canada, T6K 2B6

[21] Appl. No.: 306,375

[22] Filed: Sep. 15, 1994

[51] Int. Cl.$^6$ ................................................ B62M 29/00
[52] U.S. Cl. ........................................ 280/12.12; 180/195
[58] Field of Search ................................. 280/845, 12.1, 280/12.11, 12.12, 12.13, 12.14; 180/186, 194, 195

[56] References Cited

U.S. PATENT DOCUMENTS

| | | | |
|---|---|---|---|
| 182,095 | 9/1876 | Arnao, Jr. | 280/12.14 |
| 330,786 | 11/1885 | Hussong | 280/12.14 |
| 381,956 | 5/1888 | Schemmel | 280/12.14 |
| 387,814 | 8/1888 | Ribbel et al. | 280/12.14 |
| 393,071 | 11/1888 | Kiihr | 280/12.13 |
| 394,409 | 12/1888 | Snyder | 280/12.14 |
| 584,456 | 6/1897 | Bradbury | 280/12.13 |
| 737,372 | 8/1903 | Dupras | 280/12.12 |
| 907,351 | 11/1908 | McCoy | 280/12.14 |
| 1,001,379 | 8/1911 | Filimonesk | 280/12.1 |
| 1,234,027 | 7/1917 | Hjartarson | 280/12.12 |

FOREIGN PATENT DOCUMENTS 1736826  5/1992  U.S.S.R. ............................. 280/12.12

*Primary Examiner*—Kevin T. Hurley
*Attorney, Agent, or Firm*—Anthony R. Lambert

[57] ABSTRACT

A human powered skibob is described. A skibob is a vehicle with runners for gliding downhill over snow. With the present invention, a locomotive force is provided by a pedal powered drive assembly which includes at least one rigid suspension member depending vertically from a back of the frame. A sliding beam us slidably mounted to the at least one suspension member for sliding movement relative to the frame. Biasing springs are disposed between the sliding beam and the at least one suspension members, thereby urging the sliding beam toward a remote end of the at least one suspension member. A secondary drive sprocket is rotatably mounted to the sliding beam. The secondary drive sprocket has at least one drive member with at least two radially extending force transmitting members angularly offset and terminating in pivotally mounted gripping members. The length of the force transmitting members are such that the biasing springs are compressed when the force transmitting member is vertically extended with the gripping member engaging a snow covered groundsurface. A continuous drive linkage extends between the primary drive sprocket and the secondary drive sprocket. A force exerted via the pedals to rotate the primary drive sprocket is transmitted by the continuous drive linkage to rotate the secondary drive sprocket. Each of the gripping members on the force transmitting members alternately engages a snow covered groundsurface with a bouncing rolling gait that is accommodated by the biasing springs and the pivotal mounting of the gripping members.

10 Claims, 4 Drawing Sheets

5,482,302

HUMAN POWERED SKIBOB

BACKGROUND OF THE INVENTION

A skibob is a vehicle with runners for gliding downhill over snow. It has a seat for a rider, who may wear small skis for balance. It has long been appreciated that if the skibob could be modified by the addition of a form of human powered locomotion similar to a bicycle, the skibobs could provide a valuable form of winter transportation. In the late 1800's a form of device was developed that was termed an "Ice Velocipede". Ice Velocipedes could be considered a hybrid between a skibob and a bicycle. They generally had runners like a skibob and wheels like a bicycle. In order to improve traction the wheels generally had projecting teeth, although in some cases they had paddles. Various forms of Ice Velocipede are represented in U.S. Pat. Nos. 182,095; 381,956; 330,786; 387,814; 393,071; and 394,409. At the turn of the century some ice velocipedes were developed that had novel means of locomotion. U.S. Pat. No. 737,372 which issued to Dupras in 1903 discloses what is entitled "A runner attachment for bicycle frames". The mode of locomotion taught by Dupras is what is described as a "spur wheel", that appears to be triangular in cross-section. U.S. Pat. No. 1,001,379 which issued to Filimonesk in 1911 discloses what is described as an "icecycle". The means of locomotion taught by Filimonesk is a pair of spiral blades mounted on rotating shafts. The problem with the human powered skibobs described is that their means of locomotion is not adequate under most winter conditions.

SUMMARY OF THE INVENTION

What is required is a form of human powered skibob with an alternate means of locomotion.

According to the present invention there is provided a human powered skibob which includes a frame having a top, a front, and a back. Two snow engaging runners are fixed in spaced relation at the back of the frame. A generally vertical shaft is rotatably mounted to the front of the frame. The shaft has a lower end to which is mounted a snow engaging runner and an upper end to which is mounted a steering member. A seat is secured to the top of the frame. A primary drive sprocket is rotatably mounted to the frame. The primary drive sprocket has two radially extending force receiving members offset by 180 degrees and terminating in pedals. A drive assembly is provide which includes at least one rigid suspension member depending vertically from back of the frame. A sliding beam us slidably mounted to the at least one suspension member for sliding movement relative to the frame. Biasing means are disposed between the sliding beam and the at least one suspension member, thereby urging the sliding beam toward a remote end of the at least one suspension member. A secondary drive sprocket is rotatably mounted to the sliding beam. The secondary drive sprocket has at least one drive member with at least two radially extending force transmitting members angularly offset and terminating in pivotally mounted gripping members. The length of the force transmitting members are such that the biasing means are compressed when the force transmitting member is vertically extended with the gripping member engaging a snow covered groundsurface. A continuous drive linkage extends between the primary drive sprocket and the secondary drive sprocket. A force exerted via the pedals of the force receiving members to rotate the primary drive sprocket is transmitted by the continuous drive linkage to rotate the secondary drive sprocket. Each of the gripping members on the force transmitting members alternately engages a snow covered groundsurface with a bouncing rolling gait that is accommodated by the biasing means and the pivotal mounting of the gripping members.

The human powered skibob, as described above, can slide down a snow covered slope in the manner of a skibob, by merely ensuring that all of the gripping members are lifted off the snow covered groundsurface. When it is desired to apply a locomotive force to the skibob, a force is exerted upon the pedals to cause the gripping members to alternately engage the snow covered groundsurface. It is preferred that two drive members be provided, each having two or three gripping members. Two gripping members work best if the force transmitting members are offset by 180 degrees. Three gripping members work best if the force transmitting members are offset by 120 degrees. If secondary drive sprocket were mounted in a fixed position the force transmitted by the each gripping member and the time duration of that force would be limited. The force transmitting members are made of such a length that with a fixed mounting position they would lift the runners at the back of the frame off the groundsurface. By using the biased sliding beam together with the over-length force transmitting members, gripping members engage the snow covered groundsurface for a longer period and exert a greater force. The excess length of the force transmitting members is accommodated by the biasing means, preferably springs.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
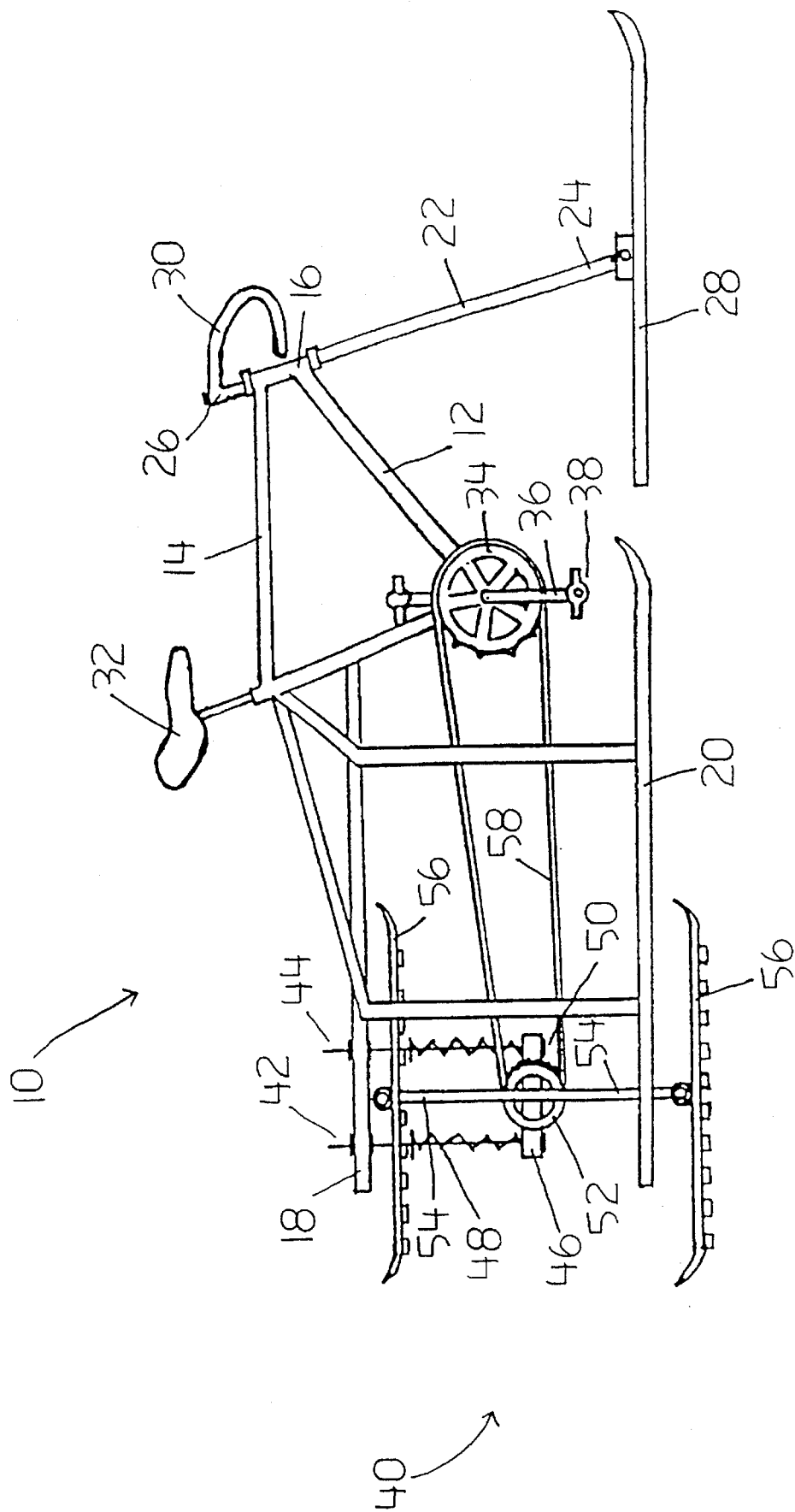
FIG. 1 is a side elevation view of a human powered skibob constructed in accordance with the teachings of the present invention.

The preferred embodiment, a human powered skibob generally identified by reference numeral 10, will now be described with reference to FIGS. 1 through 4.

Figure 2:
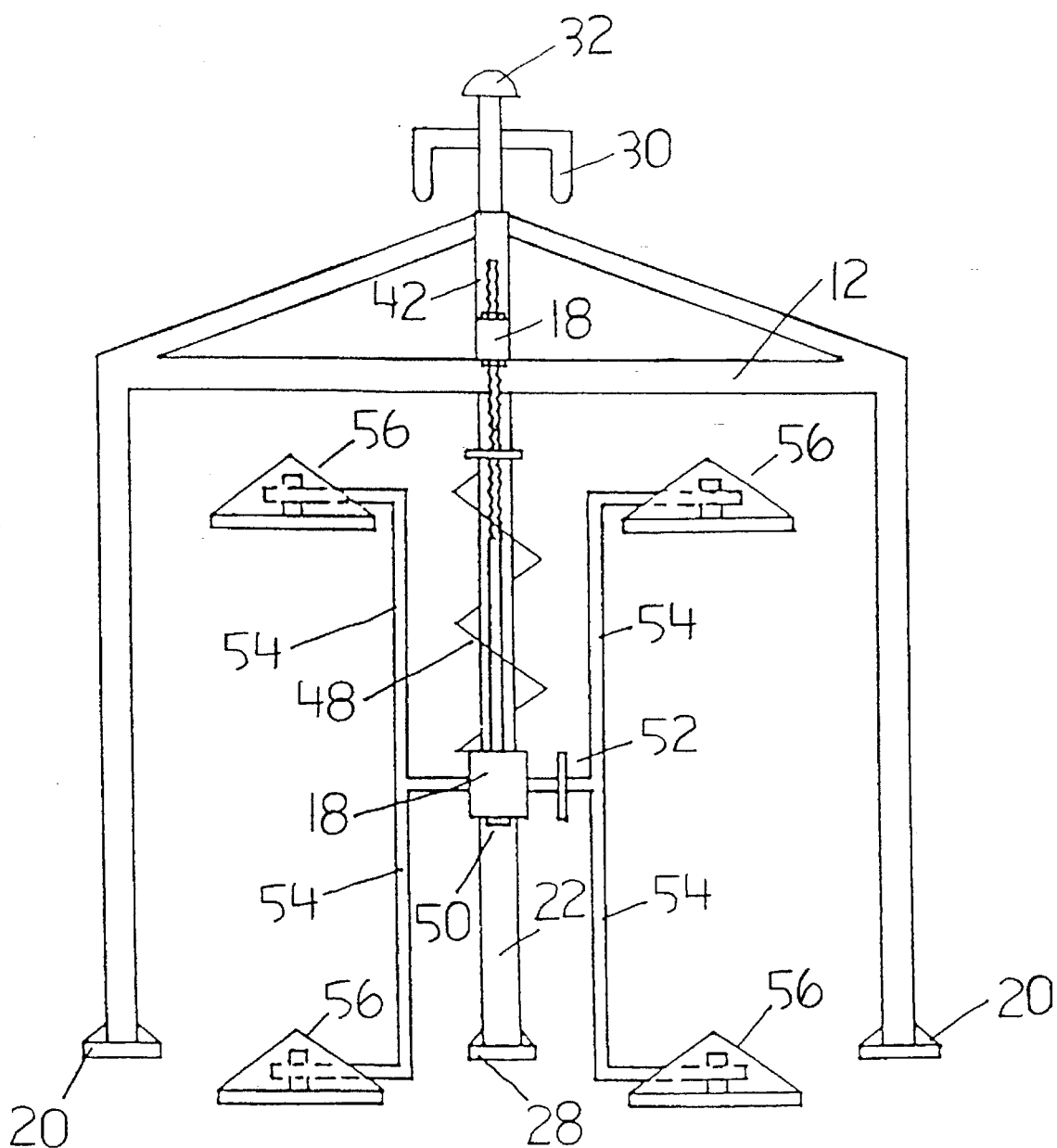
FIG. 2 is a rear elevation view of the human powered skibob illustrated in FIG. 1.
Figure 3:
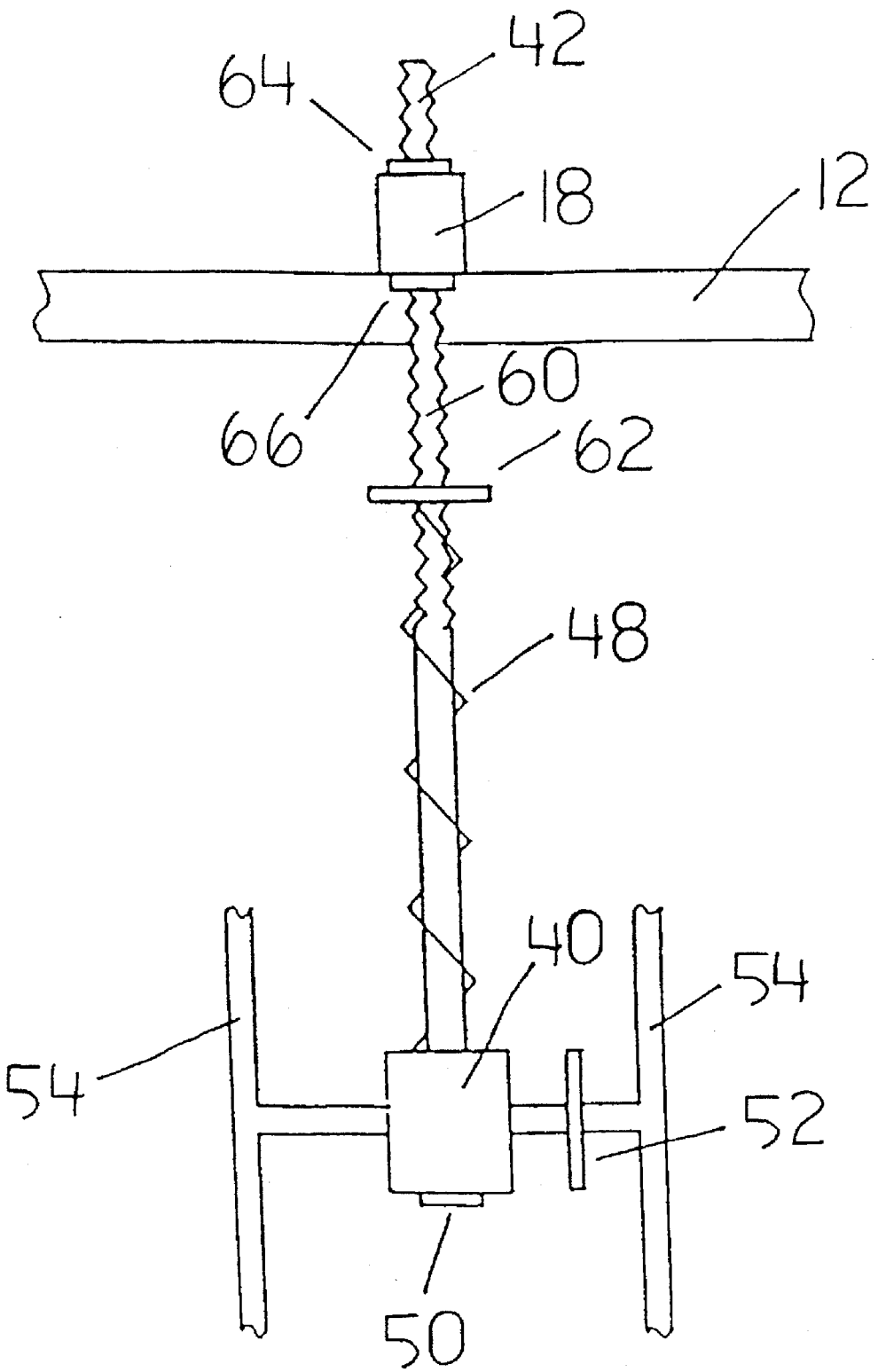
FIG. 3 is a detailed rear elevation view of a portion of the human powered skibob illustrated in FIG. 2.
Figure 4:
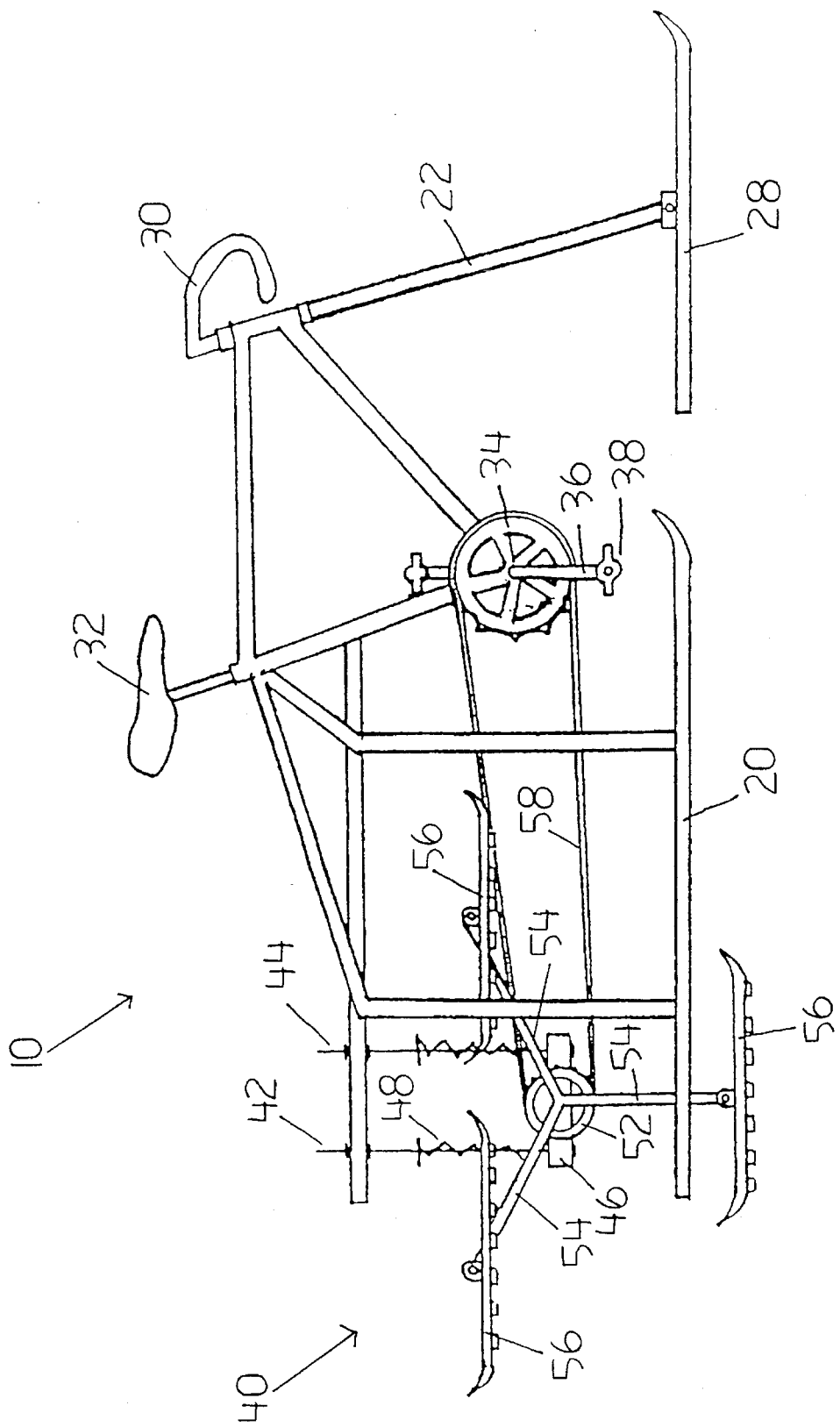
FIG. 4 is a side elevation view of an alternative embodiment of human powered skibob constructed in accordance with the teachings of the present invention.

Referring to FIG. 1, skibob 10 includes a frame 12 having a top 14, a front 16, and a back 18. Referring to FIG. 2, two snow engaging runners 20 are fixed in spaced relation at back 18 of frame 12. Referring to FIG. 1, a generally vertical shaft 22 is rotatably mounted to front 16 of frame 12. Shaft 22 has a lower end 24 and an upper end 26. A steerable snow engaging runner 28 is mounted to lower end 24. A steering member 30, such as handle bars, a steering wheel or the like, is mounted to upper end 26. A seat 32 is secured to top 14 of frame 12. A primary drive sprocket 34 is rotatably mounted to frame 12. Primary drive sprocket 34 has two radially extending force receiving members 36 which are offset by 180 degrees and terminate in pedals 38. A novel drive assembly, generally indicated by reference numeral 40, is provided. Drive assembly 40 includes a pair of spaced apart rigid suspension members 42 and 44 depending vertically from back 18 of frame 12. The length of suspension members 42 and 44 is adjustable, as will hereinafter be further described. A sliding beam 46 is slidably mounted to suspension members 42 and 44 for sliding movement along suspension members 42 and 44 relative to frame 12. Biasing springs 48 are wrapped around suspension members 42 and 44. Biasing springs 48 are disposed between sliding beam 46 and stop nuts 62 on suspension members 42 and 44. Stop nuts 62 are capable of adjustment to exert a compression force upon biasing springs 48, as will hereinafter be described. Biasing springs 48 serve to urge sliding beam 46 toward a remote end 50 of suspension members 42 and 44. A secondary drive sprocket 52 is rotatably mounted to sliding beam 46. Referring to FIG. 2, secondary drive sprocket 52 has attached to it a first drive member 51 and a second drive member 53. First drive member 51 and second drive member 53 are parallel. Each of drive members 51 and 53 have a plurality of radially extending force transmitting members 54. Referring to FIG. 1, two radially extending force transmitting members 54 offset by 180 degrees are provided. Referring to FIG. 4, there is illustrated an alternative embodiment in which three radially extending force transmitting members 54 angularly offset by 120 degrees are provided. Referring to FIG. 1, each of force transmitting members 54 terminates in pivotally mounted foot-like gripping members 56. The length of force transmitting members 54 is such that biasing springs 48 are compressed as each force transmitting member 54 is vertically extended with gripping member 56 engaging a snow covered groundsurface. A continuous drive chain 58 extends between primary drive sprocket 34 and secondary drive sprocket 52. Referring to FIG. 3, an upper portion 60 of suspension members 42 and 44 is threaded. A threaded nut 62 is positioned on threaded upper portion 60, the purpose of which will hereinafter be explained in relation to use and operation of skibob 10. In addition, there are two nuts 64 and 66 which secure each suspension member 42 and 44 to back 18 of frame 12.

The use and operation of skibob 10 will now be described in relation to FIGS. 1 through 4. In order to use skibob 10 in a conventional manner for gliding down a snow covered slope, only sufficient force is exerted upon pedals 38 to lift gripping members 56 clear of the groundsurface, without continuously rotating secondary drive sprocket 52. When, at the bottom of the slope, it is desired to move forward; drive assembly 40 is engaged. A force is exerted via pedals 38 of the force receiving members 36 to rotate primary drive sprocket 34. The rotation of primary drive sprocket 34 is transmitted by continuous drive chain 58 to rotate secondary drive sprocket 52. Drive members 51 and 53 rotate with secondary drive sprocket 52. As drive members 51 and 53 rotate each of gripping members 56 on force transmitting members 54 alternately engage a snow covered groundsurface with a bouncing rolling gait that is accommodated by biasing springs 48 and the pivotal mounting of gripping members 56.

If secondary drive sprocket 52 were mounted in a fixed position the force transmitted by gripping member 56 and the time duration of that force would be limited. Force transmitting members 54 are made of such a length that with a fixed mounting position they would lift runners 20 at back 18 of frame 12 off the groundsurface. By using sliding beam 46 together biasing springs 48 and over-length force transmitting members 54, gripping members 56 engage the snow covered groundsurface for a longer period and exert a greater force. The excess length of force transmitting members 54 is accommodated by biasing springs 48. The pressure of biasing springs 48 is adjustable by rotation of nut 62. Rotation of nut 62 exerts a compression force upon biasing springs 48. While fine adjustment may be accomplished by means of rotation of nut 62, major adjustments must be accomplished by means of nuts 64 and 66. As snow conditions vary, it may be necessary to increase or decrease the engagement of gripping members 56 with the snow to a greater degree than is possible by means of nut 62. In such cases, the length of suspension members 42 and 44 depending from back 18 of frame 12 is altered by means of nuts 64 and 66. The adjustment, as described, increases the amount of force exerted and the length of time that gripping members remain in contact with the groundsurface.

It will be apparent to one skilled in the art that modifications may be made to the illustrated embodiment without departing from the spirit and scope of the invention as defined by the claims.

What is claimed is:

1. A human powered skibob, comprising:

a frame having a top, a front, a back, two snow engaging runners fixed in spaced relation at the back of the frame, a generally vertical shaft rotatably mounted to the front of the frame, the shaft having a lower end to which is mounted a snow engaging runner and an upper end to which is mounted a steering member, a seat being secured to the top of the frame;

a primary drive sprocket rotatably mounted to the frame, the primary drive sprocket having two radially extending force receiving members offset by 180 degrees and terminating in pedals;

a drive assembly, including:

at least one rigid suspension member depending vertically from the frame;

a sliding beam slidably mounted to the at least one suspension member, for sliding movement relative to the frame;

biasing means disposed between the sliding beam and the at least one suspension member, thereby urging the sliding beam toward a remote end of the at least one suspension member;

a secondary drive sprocket rotatably mounted to the sliding beam, the secondary drive sprocket having at least one drive member with at least two radially extending force transmitting members angularly offset, each of the force transmitting members terminating in a ground surface engaging pivotally mounted foot-like gripping member, only one of the foot-like gripping members engaging a snow covered ground surface at any one time during forward locomotion, the radially extending members being capable of orientation to lift the gripping members clear of the snow covered ground surface in order to permit uncontrolled sliding down a slope, the length of the force transmitting members being such that the biasing means are compressed when the force transmitting member is vertically extended with the foot-like gripping member engaging the snow covered ground surface; and a continuous drive linkage extending between the primary drive sprocket and the secondary drive sprocket such that a force exerted via the pedals of the force receiving members to rotate the primary drive sprocket is transmitted by the continuous drive linkage to rotate the secondary drive sprocket resulting in each of the foot-like gripping members on the force transmitting members alternately engaging a snow covered ground surface with a bouncing rolling gait that is accommodated by the biasing means and the pivotal mounting of the gripping members.

2. The human powered skibob as defined in claim 1, wherein two rigid suspension members are provided in spaced relation.

3. The human powered skibob as defined in claim 1, wherein two parallel drive members are provided.

4. The human powered skibob as defined in claim 1, wherein the at least two radially extending force transmitting members are angularly offset by 180 degrees.

5. The human powered skibob as defined in claim 1, wherein there are three radially extending force transmitting members angularly offset by 120 degrees.

6. A human powered skibob, comprising:

a frame having a top, a front, a back, two snow engaging runners fixed in spaced relation at the back of the frame, a generally vertical shaft rotatably mounted to the front of the frame, the shaft having a lower end to which is mounted a snow engaging runner and an upper end to which is mounted a steering member, a seat being secured to the top of the frame;

a primary drive sprocket rotatably mounted to the frame, the primary drive sprocket having two radially extending force receiving members offset by 180 degrees and terminating in pedals;

a drive assembly, including:

a pair of spaced apart rigid suspension members depending vertically from the frame:

a sliding beam slidably mounted to the suspension members for sliding movement along the suspension members relative to the frame;

biasing springs wrapped around the suspension members and disposed between the sliding beam and a stop on the suspension members, thereby urging the sliding beam toward a remote end of the suspension members;

a secondary drive sprocket rotataby mounted to the sliding beam, the secondary drive sprocket having two drive members each of which has three radially extending force transmitting members angularly offset by 120 degrees, each of the force transmitting members terminating in a ground surface engaging pivotally mounted foot-like gripping member, only one of the foot-like gripping members engaging a snow covered ground surface at any one time during forward locomotion, the radially extending members being capable of orientation to lift the gripping members clear of the snow covered ground surface in order to permit uncontrolled sliding down a slope, the length of the force transmitting members being such that the biasing springs are compressed as each force transmitting member is vertically extended with the gripping member engaging the snow covered ground surface; and a continuous drive chain extending between the primary drive sprocket and the secondary drive sprocket such that a force exerted via the pedals of the force receiving members to rotate the primary drive sprocket is transmitted by the continuous drive chain to rotate the secondary drive sprocket resulting in each of the gripping members on the force transmitting members alternately engaging a snow covered ground surface with a bouncing rolling gait that is accommodated by the biasing springs and the pivotal mounting of the gripping members.

7. The human powered skibob as defined in claim 6, wherein means is provided to selectively adjust the positioning of the stop thereby adjusting the force exerted by the biasing springs.

8. The human powered skibob as defined in claim 7, wherein the spring force adjusting means includes having an upper portion of the suspension members threaded, the stop being a threaded nut positioned on the threaded upper portion of each of the suspension members such that by rotation of the nut a compression force is exerted upon the biasing springs.

9. The human powered skibob as defined in claim 6, wherein means is provided to adjust the length of the suspension members.

10. The human powered skibob as defined in claim 9, wherein the suspension members are secured to the back of the frame by means of nuts such that the length of the suspension members is adjustable.

* * * * *